(12) United States Patent
Mizuta et al.

(10) Patent No.: US 7,425,295 B2
(45) Date of Patent: Sep. 16, 2008

(54) PRODUCTION METHOD OF TONE WHEEL

(75) Inventors: Hideo Mizuta, Okayama (JP); Manabu Ono, Okayama (JP)

(73) Assignee: Uchiyama Manufacturing Corp., Enami, Okayama-shi, Okayama (JP)

( * ) Notice: Subject to any disclaimer, the term of this patent is extended or adjusted under 35 U.S.C. 154(b) by 122 days.

(21) Appl. No.: 11/476,085

(22) Filed: Jun. 28, 2006

(65) Prior Publication Data
US 2007/0007697 A1    Jan. 11, 2007

(30) Foreign Application Priority Data
Jun. 28, 2005    (JP) .............................. 2005-188244

(51) Int. Cl.
*B29C 33/38*    (2006.01)
*B29C 43/02*    (2006.01)

(52) U.S. Cl. ...................... 264/429; 264/427; 264/437; 264/DIG. 58

(58) Field of Classification Search ....................... None
See application file for complete search history.

(56) References Cited
U.S. PATENT DOCUMENTS
4,441,875 A * 4/1984 Saito et al. ................... 425/3
4,904,175 A * 2/1990 Horibe et al. ............ 425/174.4
2002/0027192 A1* 3/2002 Yamaguchi et al. ..... 250/231.13
2002/0078549 A1* 6/2002 Yamaguchi ............... 29/603.01
2004/0036631 A1* 2/2004 Kayao .......................... 341/15
2004/0183702 A1* 9/2004 Nachtigal et al. ............. 341/16
2005/0007226 A1* 1/2005 Mizuta ........................ 335/207
2006/0186577 A1* 8/2006 Taniguchi et al. ........... 264/319
2007/0132612 A1* 6/2007 Hideo .......................... 341/50

* cited by examiner

*Primary Examiner*—Mary Lynn F Theisen
(74) *Attorney, Agent, or Firm*—Bacon & Thomas, PLLC

(57) ABSTRACT

A Production method of tone wheel made of elastic material to be fixed to a rotating member in which a magnetic encoder is assembled in combination of the tone wheel and a magnetic sensor provided at a fixed member. The tone wheel is produced by using newly designed an assembled molding die which comprises one die blocks and the other die blocks which are detachably engaged each other, and which has a flash groove at matching surface where the distal of the one die blocks and that of the other die blocks are matched. The one die blocks have an annular molding surface formed on the magnetic die member side of the assembled die, and the other die blocks have an annular molding receiving surface part which is formed with an annular molding surface.

7 Claims, 17 Drawing Sheets

PRODUCTION METHOD OF TONE WHEEL

FIELD OF THE INVENTION

The present invention relates to a production method of tone wheel which is attached to a rotating member (wheel and the like) of automobile and constitutes a magnetic encoder for detecting the rotation and position of wheels together with a magnetic sensor provided on a fixed member (automobile body).

PRIOR ART

Magnetic encoder for detecting the rotation as mentioned above has been comprised of a tone wheel and a magnetic sensor provided for an automobile body, in which the tone wheel is constructed such that a slinger is fixed to a rotating side of a bearing unit as a core metal, and a rubber magnet which is mixed with magnetic powder such as ferrite and is magnetized by alternately arranging plural north poles and south poles in the circumferential direction is attached to a brim portion of the slinger, as disclosed in JP-A-2001-241435. A slinger which has been made of sheet metal processing in advance and a rubber material mixed with a magnetic powder are integrally vulcanized with a molding apparatus, a rubber magnet is integrally attached to the brim portion of the slinger, and thereafter plural north poles and south poles are alternately arranged in the circumferential direction of the magnetic rubber with a magnetizing apparatus, thereby producing a tone wheel.

Anisotropic hexagonal tabular powder has been often used as ferrite powder. It is preferable the ferrite powder particles are aligned along the same direction (thickness direction) in a rubber layer of the rubber magnet in order to bring out the magnetic characteristic more effectively. According to such a production method, magnetizing is executed after vulcanization molding, so that the ferrite powder is randomly aligned to be solidified in the rubber layer when being magnetized. Therefore, the magnetic characteristic of ferrite powder is not adequately achieved and the used amount of ferrite powder has to be increased in order to have a desirable magnetic characteristic.

JP-A-2003-25363 and JP-A-2004-212151 disclose a magnetic molding method in which magnetic field is acted on rubber in parallel with vulcanization when a rubber magnet (rubber composition) is vulcanized and molded, contained anisotropic magnetic powder such as ferrite is aligned in the same direction, namely the easy axis of magnetization of anisotropic magnetic powder is substantially uniformed, and superior magnetic characteristic of anisotropic magnetic powder is adequately achieved by magnetizing thereafter. Molding die comprised of plural assembled molding dies combined with a non-magnetic die member and a magnetic die member is used as a molding apparatus for such a magnetic molding method. The magnetic die members function as a yoke for producing magnetic field and are arranged as a front yoke and a back yoke so as to face the front and back surfaces of the material to be molded (unvulcanized rubber material including magnetic powder) charged in a cavity. The magnetic field by a coil generates a magnetic field relative to the material via the front yoke and the back yoke. Because of such magnetic field, the magnetic powder acts and orients in the rubber material under vulcanization so as to align the easy axis of magnetization.

The assembled molding die is comprised of a magnetic die member working as a front yoke or a back yoke which constitutes a part of magnetic circuit and a non-magnetic die member as a complex member which surrounds the magnetic die member, the magnetic die member and the non-magnetic die member are integrally assembled by means of thermal insert and these members are arranged in the cavity in such a manner that a part of them faces to each other in the cavity. Even though each assembled molding die is integrally formed with the magnetic die member and the non-magnetic die member by means of thermal insert, there causes slight gap of matching surface (fitting face) after several usage. The material to be formed enters into the gap to remain as flash (called as incursion flash, hereinafter), thereby deteriorating the production quality. According to such a molding apparatus, a flash groove is formed on one of assembled molding dies so as to adequately fill the cavity with the material in the cavity, however, if the flash groove is formed along the fitting face, the incursion flash is removed together with a flash formed by the flash groove (called as design flash, hereinafter) of the assembled molding die formed with the flash groove, so that no problems are caused on the product quality.

However, on the assembled molding die without having the flash groove, the product has the incursion flash, which has adverse effect on the product quality, so that remove operation of the incursion flash like the design flash is required, thus increasing the operation processes. In addition, high accuracy of product shape is required for the assembled molding die without a flash groove, so that the incursion flash should be carefully removed and finished, thereby requiring a lot of labor and workmanship.

SUMMARY OF THE INVENTION

The present invention is proposed to solve the above-mentioned problems and the object is to provide a new production method of tone wheel in which a material to be molded is prevented from entering into the matching surface of a magnetic die member and a non-magnetic die member in case of magnetic molding process and in which a tone wheel with superior magnetic characteristic is effectively produced.

According to the present invention, a magnetic field is acted on an elastic raw material via a magnetic die member of each assembled molding die at a magnetic molding process and the elastic raw material (material to be molded) is molded while aligning magnetic powder in one direction by acting magnetic field of one direction. As a result that the raw elastic material is solidified while the easy axis of magnetization of the magnetic powders contained in them are oriented in same one direction. Therefore, at the magnetizing procedure thereafter, the magnetic characteristic of magnetic powder is adequately achieved, thereby producing a high performance tone wheel.

While the elastic raw material is charged in the cavity at the magnetic molding process, a part of non-magnetic die member constituting the assembled molding die exists between the magnetic die member and the elastic raw material in the cavity of the assembled molding die without having flash groove in such a manner the elastic raw material and the magnetic die member do not directly contact. Therefore, even if there is any gap at the matching surfaces (fitting face) of the magnetic die member and a non-magnetic die member, the elastic raw material does not enter into the fitting face, so that there is no fear of deteriorating the product quality. In addition, troublesome operations for removing the incursion flash are not required. Either one of a pressure molding apparatus and an injection molding apparatus is applicable as a molding apparatus.

Further according to the present invention, the elastic raw material is an unvulcanized rubber and is heated and vulcanized to be formed at the magnetic molding process, so that the magnetic powder can be effectively aligned into the easy axis of magnetization when the unvulcanized rubber with fluidity is vulcanized, and in addition it can be surely solidified under such condition that the magnetic powder is substantially and equally aligned with the easy axis of magnetization. Still further according to the present invention, if the magnetic powder is anisotropic ferrite powder, such powder is easily obtained at low cost and has good orientation property, so that a tone wheel with strong magnetic intensity can be obtained. Magnetic powder of rare earths can be used other than ferrite powder.

Still further according to the present invention, the magnetic die member constituting the assembled molding die and the elastic raw material are arranged so as to directly contact in the cavity of the assembled molding die which is formed with a flash groove, thereby forming a magnetic field directly and effectively relative to the elastic raw material. Providing a flash groove communicating with the fitting face of the magnetic die member and the non-magnetic die member, the elastic raw material entered in the fitting face can be removed as a design flash and the procedures required for finish operation are the same as general molding. Still further according to the present invention, when the thickness of a part of the non-magnetic die member in which the elastic raw material and the magnetic die member exist so as not to directly contact, if the acting direction of the magnetic field is set as 0.3 mm-10 mm, the non-magnetic die member interposed between the elastic raw material and the magnetic die member does not prevent generation of magnetic field. If the thickness is less than 0.3 mm, this part may be damaged by the pressure of molding. If it exceeds 10 mm, the magnetic field enough for orientation cannot be obtained.

DETAILED DESCRIPTION OF THE INVENTION

Now the preferred embodiments according to the present invention will be described referring to the attached drawings.

Figure 1:
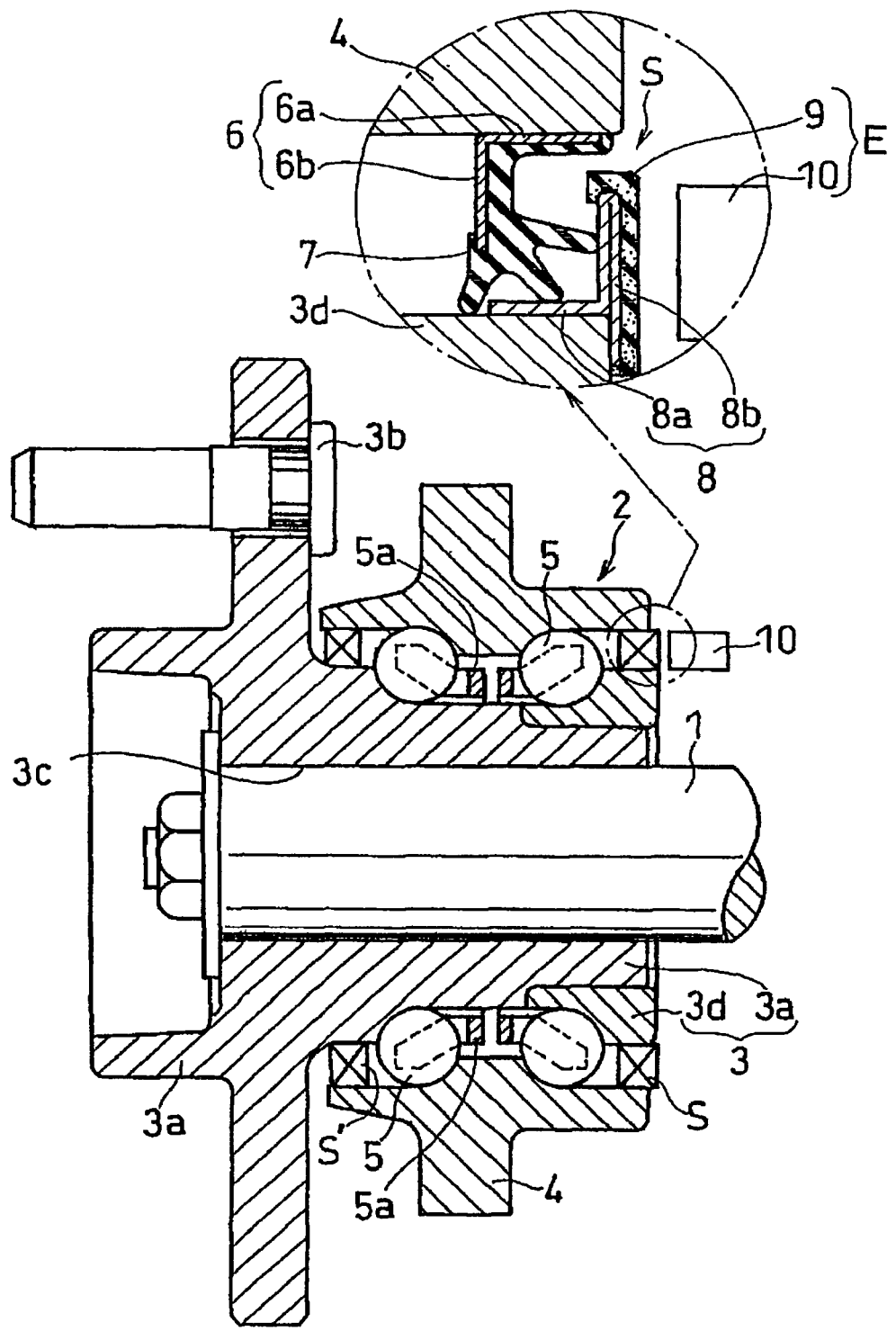
FIG. 1 is a vertical sectional view showing one embodiment of a bearing unit to which the tone wheel obtained by the present invention is incorporated.

FIG. 1 shows one supporting structure of the vehicle axis relative to a shaft 1 with a rolling bearing unit 2. A tire wheel (not shown) is fixed to a hub wheel 3a constituting an inner wheel (rotary member) with a bolt 3b. The reference numeral 3c indicates a spline hole provided for the hub wheel 3a, the drive shaft 1 is fitted in the spline hole 3c to be integrally fixed with the hub wheel 3a and the rotary drive force of drive shaft 1 is transmitted to the tire wheel via the hub wheel 3a. The reference numeral 3d indicates an inner wheel member and constitutes an inner wheel 3 together with the hub wheel 3a.

The reference numeral 4 indicates an outer wheel (fixed member) and is fixed to the vehicle suspension (not shown). Two rows of rolling elements (ball) 5 . . . are interposed between the outer wheel 4 and the inner wheel 3 (hub 3a and inner wheel member 3d) while being held with a retainer 5a. The reference numerals S, S' indicate a seal ring in order to prevent leakage of lubricant (such as grease) filled in a rolling portion of the rolling elements 5 . . . or to prevent entering of muddy water and dirt from outside and the seal ring is provided under pressure between the outer wheel 4 and the inner wheel 3. The seal ring S at the vehicle body side is constituted as a pack seal type seal ring as shown in the figure such that a ring like core metal 6 to be fitted in the inner circumference of the outer wheel 4 under pressure, an elastic seal member (seal lip) 7 made of an elastic material like rubber to be fixed to the core metal 6, and a slinger (core metal) 8 to be externally fitted in the outer circumference of the inner wheel member 3d are assembled.

The slinger 8 is comprised of a cylindrical portion 8a to be externally fitted in the outer circumference of the inner wheel member 3d and an outward brim portion (brim like portion) 8b of a part of the cylindrical portion 8a extending in the radial direction (centrifugal direction). The outward brim portion 8b is coupled in a centrifugal direction from one end of the cylindrical portion 8a and is folded back in the centripetal direction so as to be overlapped in the figure and a part thereof is designed to cohere to the end face of the inner wheel member 3d. Such structure increases the sticking area of tone wheel 9, as mentioned later.

The core metal 6 is comprised of a cylindrical portion 6a to be internally fitted in the inner circumference of the outer wheel 4 and an inward brim portion 6b formed at the base of a rolling element 5 side of the cylindrical portion 6a extending in the radial direction (centripetal direction). The vehicle side surface (outer surface) of the outward brim portion 3b of the slinger 8 is integrally attached with the tone wheel 9 which is a magnetic rubber sheet formed by mixing magnetic powder such as ferrite in a rubber material and is magnetized so as to alternately arrange plural north poles and south poles in the circumferential direction. A magnetic sensor 10 is fixed to the vehicle side (fixed member side) in such a manner that the detecting surface faces to the tone wheel 9 and constitutes a magnetic encoder E for detecting the rotary number (rotary speed) of vehicles together with the tone wheel 9. At the seal ring S incorporated between the inner wheel 3 and the outer wheel 4, the slinger 8 rotates around the axis of the drive shaft 1 according to the axial rotation of the drive shaft 1 and the inner wheel 3 and at the same time the tone wheel 9 rotates around the axis of the drive shaft 1, the magnetic sensor 10 detects the alternate magnetic change in the north pole and the south pole accompanied with the rotation of tone wheel 9, and the rotary speed and so on of the drive shaft 1, namely the tire wheel (not shown), are calculated by counting the pulse signals generated by the magnetic change.

The core metal 6 or the slinger member 8 is formed by metal processing of the cold rolled steel sheet like SPCC into the shape as shown in the figure. The magnetic rubber sheet for the sealing member 7 or the tone wheel 9 is formed such that a rubber material selected from NBR, H-NBR, ACM, AEM, FKM and so on is stuck to the core metal 6 or the slinger 8 with an adhesive agent or at the same time of vulcanization molding to be integrated. As the rubber material for the latter, ferrite magnetic powder or rare earth magnetic powder is mixed in advance as mentioned above.

Figure 2:
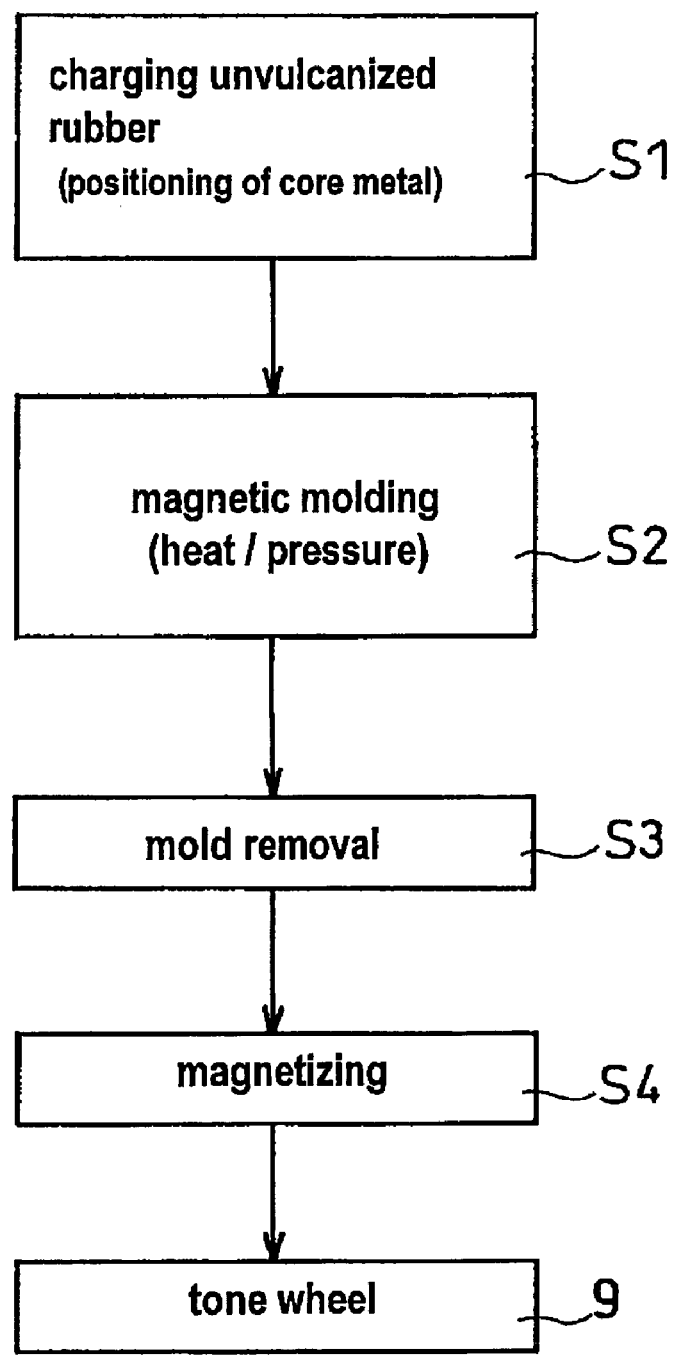
FIG. 2 is a diagrammatical process chart of the production method according to the present invention.

Next, a production method of tone wheel according to the present invention will be explained. FIG. 2 shows its diagrammatical procedures. At step S1, an unvulcanized rubber (elastic raw material) in which a fixed amount of anisotropic magnetic powder such as ferrite powder and additive are mixed with the above-mentioned unvulcanized rubber material in advance is charged in an annular cavity of the magnetic molding apparatus, which is mentioned later. Forming integrally with the core metal (slinger), the core metal is arranged in a fixed position in the cavity before charging the unvulcanized rubber. An adhesive agent is preferably applied in advance on the surface of the slinger to be attached with the tone wheel. At step 2, while the magnetic field is acted on the charged unvulcanized rubber by applying the current to a coil for generating magnetic field as mentioned later, the rubber is heated (170° C.-230° C.) and is further pressurized in case of pressure molding, thereby executing vulcanization magnetic molding. The above-mentioned anisotropic magnetic powder mixed and blended in the unvulcanized rubber is aligned by the action of magnetic field at the vulcanization procedure such that the easy axis of magnetization becomes along the magnetic field direction, thereby being solidified in a vulcanized rubber layer as it is while being vulcanized.

After completing the above magnetic molding and removal of dies at step S3, obtained are an annular vulcanized rubber molded body (annular molded body) or an integral molded body of the annular rubber layer (annular elastic material layer) with the core metal. At step 4, using the well-known magnetizing apparatus, the surface of the annular rubber layer of the molded body is magnetized with a pattern repeating plural north poles and south poles in the circumferential direction, thereby completing the tone wheel 9 to comprise the above-mentioned encoder E. According to the tone wheel 9, under the magnetic molding procedure as mentioned above, the easy axis of magnetization of the contained anisotropic magnetic powder is arranged so as to be along the magnetic field direction, so that magnetizing can be accurately executed by the magnetizing procedure at the step 4 thereafter, thereby achieving very strong magnetic characteristic.

EMBODIMENT 1

Figure 3:
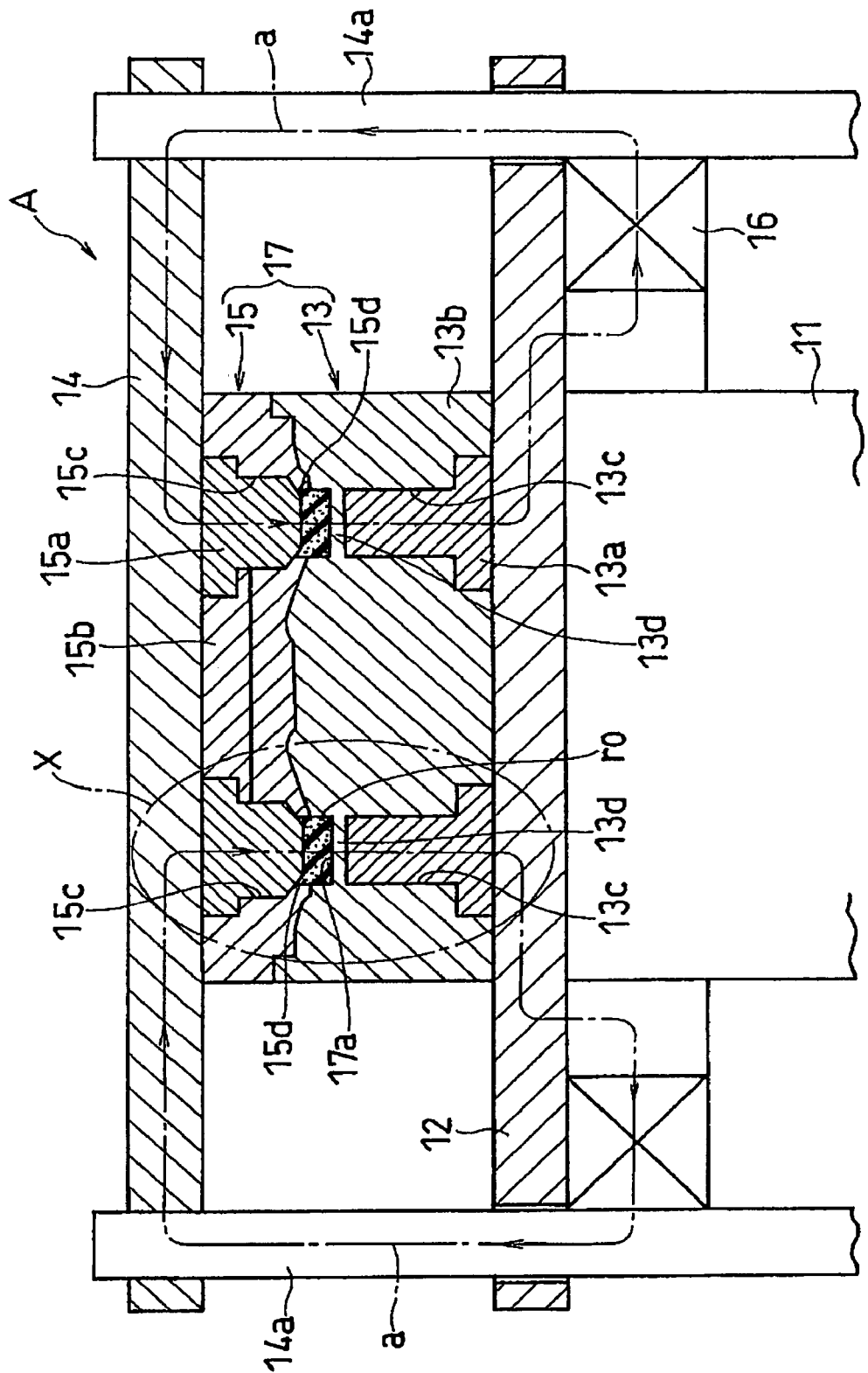
FIG. 3 is a vertical sectional view showing one preferable embodiment of a magnetic molding apparatus applied to the production method of the tone wheel of the present invention.
Figure 5:
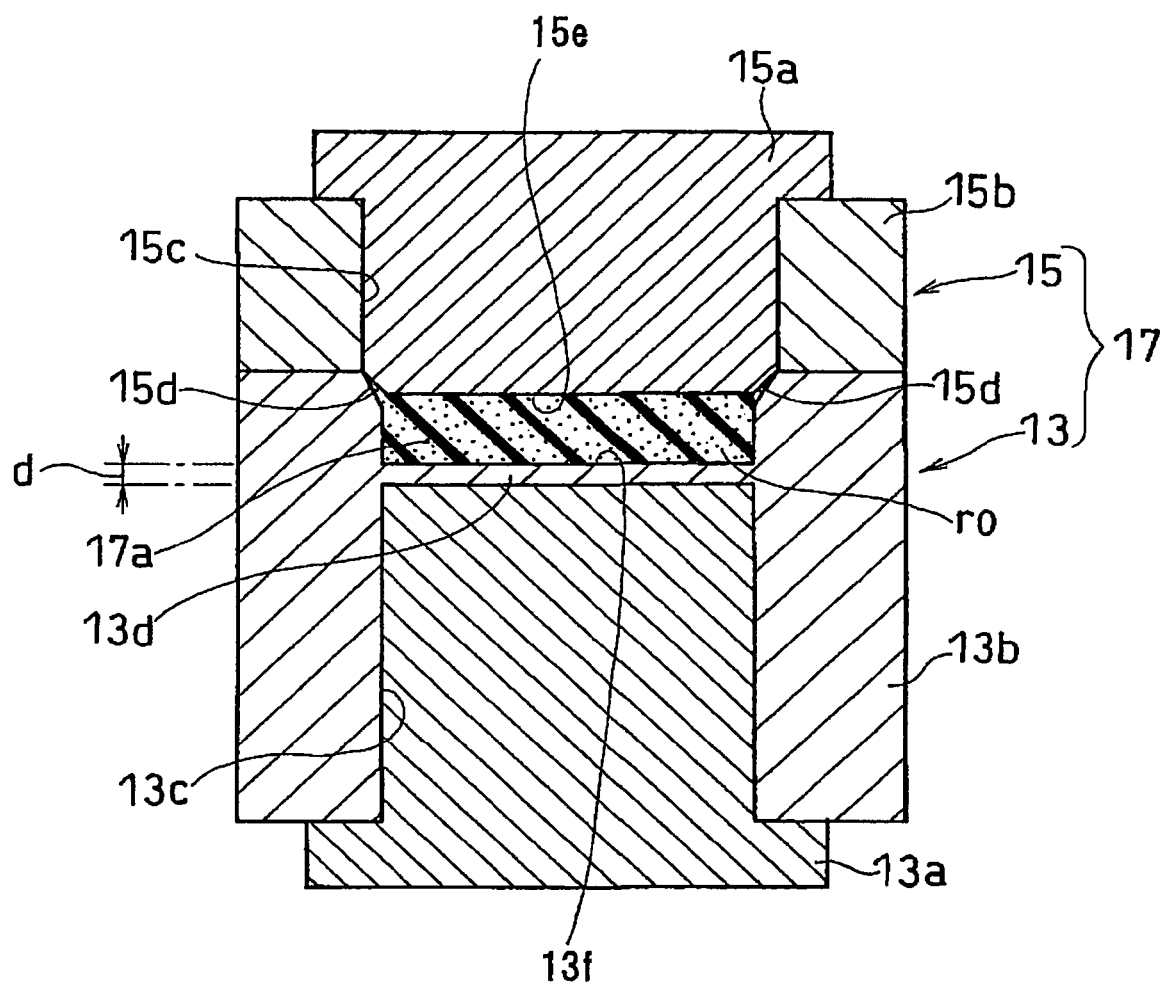
FIG. 5 is an enlarged view diagrammatically showing an essential part "X" in FIG. 3.

FIG. 3 and FIG. 5 show one preferable embodiment of a magnetic molding apparatus applied to the production method of the tone wheel of the present invention. The magnetic molding apparatus A in the figure shows a pressure and hot molding apparatus, however it does not exclude an injection molding apparatus. In this embodiment, the elastic raw material is produced as an annular molded body which is separated from the core metal in case of magnetic molding procedure. In case of injection molding apparatus, an injection passage of an unvulcanized rubber communicated with the cavity 17a is provided which starts at the center portion of the assembled molding die 17 as mentioned later. The magnetic molding apparatus A has a movable board 12 made of magnetic material which is moved up and down by a ram 11, a fixed board 14 made of magnetic material which is supported above the movable board 12 by means of a support pillar 14a made of magnetic material, an upper metal mold (constituting one die block of assembled molding die) 15 attached to the lower surface of the fixed board 14, a lower metal mold (constituting the other die block of assembled molding die) 13 disposed on the movable board 2, and a coil 16 for generating magnetic field attached to the lower surface of the movable board 12 concentrically with the ram 11 (concentric with an annular cavity 17a, mentioned later). Further, a heating means, a driving source for telescopic motion of ram 11, and a driving means of the coil 16 for generating magnetic field are provided therearound, although they are not shown in the figures.

The assembled molding die 17 comprises the lower metal mold 13 and the upper metal mold 15, which are detachably engaged when the movable board 12 goes up accompanied with the extension of ram 11, thus molding the annular cavity 17a between the metal molds 13, 15. The upper metal mold 15 forms an annular molding surface 15e at the tip of the magnetic die 15a and the lower metal mold 13 has an annular molding receiving surface part 13d formed with an annular molding surface 13f on the non-magnetic member 13b. The magnetic die member 13a is incorporated into the annular molding receiving surface part 13d opposite to the annular molding surface 13f. The lower metal mold 13 and the upper metal mold 15 are formed such that magnetic die members 13a, 15a made of carbon steel and so on and non-magnetic die members 13b, 15b made of a non-magnetic free cutting steel with high hardness are integrated respectively. Each magnetic die member 13a, 15a has a shape as to be disposed to interpose the cavity 17a from up and down, and the non-magnetic molding dies 13b, 15b are processed to be such a shape to be disposed therearound. The magnetic die members 13a and 15a are disposed above and under the cavity 17a respectively and function as a back yoke and a front yoke which constitute a apart of magnetic circuit at the time of generating a magnetic field. The magnetic die member 13a and the non-magnetic die member 13b, and the magnetic die member 15a and the non-magnetic die member 15b are integrated by thermal insert respectively, and the reference numerals 13c and 15c show the matching surfaces (fitting face).

The magnetic die member 15a constituting the upper metal mold 15 faces the inside of the cavity 17a and is arranged so as to directly contact with an unvulcanized rubber (elastic raw material) r0 charged in the cavity 17a shown in the figure. Flash groove 15d connected to the matching surface 15c is formed at the circumference facing the inside of the cavity 17a. The non-magnetic die member 13b of the lower metal mold 13 faces the inside of the cavity 17a such that an annular molding receiving surface part 13d covers the upper surface of the magnetic die member 13a and is interposed between the unvulcanized rubber material r0 charged in the cavity 17a and the magnetic die member 13a in such a manner that they do not contact with each other.

The unvulcanized rubber material r0 mixed with magnetic powder in advance is charged in the cavity 17a, the ram 11 is operated to go up the movable board 12, thereby executing hot and pressure molding while heating at the above-mentioned vulcanization temperature. At the same time of hot and pressure molding, the current is applied to the coil 16 by means of a driving means, not shown, to run the current through a lead wire, thereby generating the magnetic field around the coil 16 as shown with a line of magnetic force "a" in FIG. 3 The line of magnetic force "a" forms a loop magnetic field of support pillar 14a→fixed board 14→magnetic die member 15a of the upper metal mold 15→unvulcanized rubber material r0 in cavity 17a→part 13d of non-magnetic die member 13b of lower metal mold 13→magnetic die member 13a of lower metal mold 13→movable board 12→coil 16. The magnetic field is acted on the unvulcanized rubber r0 in the cavity 17a in the direction of its thickness by the loop magnetic field, the anisotropic magnetic powder in the unvulcanized rubber material r0 with fluidity is aligned such that the easy axis of magnetization becomes along the magnetic field (magnetic line of force "a") by the act of magnetic field, thereby being solidified under such aligned condition while vulcanization is processing.

The magnetic die members 13a and 15a are constructed so as to be surrounded with the non-magnetic die members 13b and 15b respectively, so that the magnetic line of force "a" has good converging property and the magnetic field is effectively acted on the unvulcanized rubber material r0. Because the above-mentioned non-magnetic part 13d exists between the unvulcanized rubber material r0 in the cavity 17a and the magnetic die member 13a of the lower metal mold 13, the part 13d slightly hinders the magnetic line of force "a" from passing, however, there is no problem to mold the magnetic field if the thickness "d" is set from 0.3 mm to 10 mm.

The unvulcanized rubber material r0 is designed not to directly contact with the magnetic die member 13a of the lower metal mold 13 by providing the part 13d, so that even if there may cause a little gap on the matching surfaces 13c of the lower metal mold 13 when being used several times, the unvulcanized rubber material r0 does not enter the gap and there is no fear of producing incursion flash. Further, the matching surface 13c of the upper metal mold 15 is formed so as to be connected with the flash groove 15d, so if there causes a little gap on the matching surface 15c as mentioned above, the flash formed by entering into the gap is removed as design flash together with the flash formed by the flash groove 15d. Therefore, there is no adverse effect on the quality like the prior molding method.

EMBODIMENT 2

Figure 4:
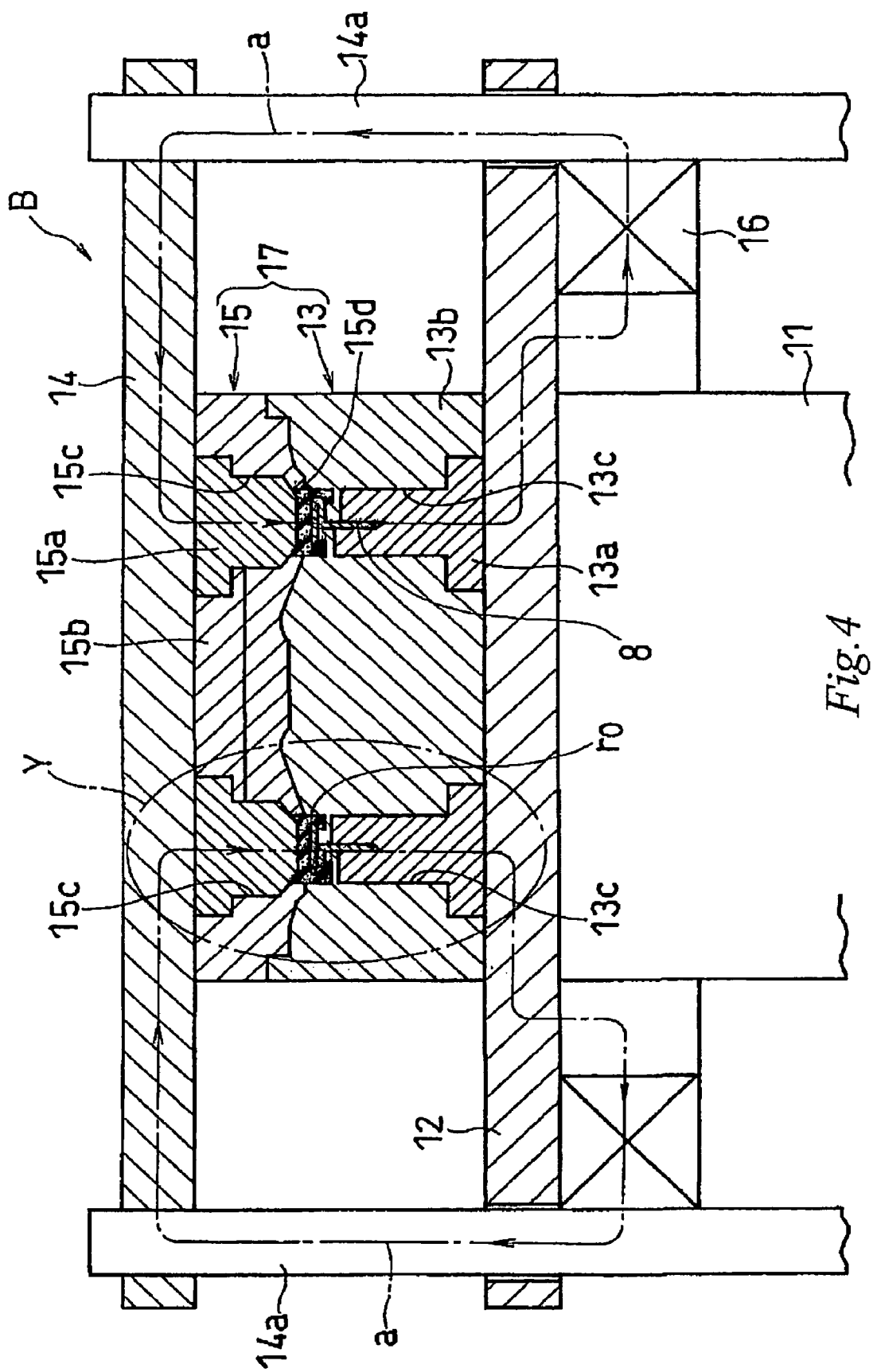
FIG. 4 shows other preferable embodiment of FIG. 3.
Figure 6:
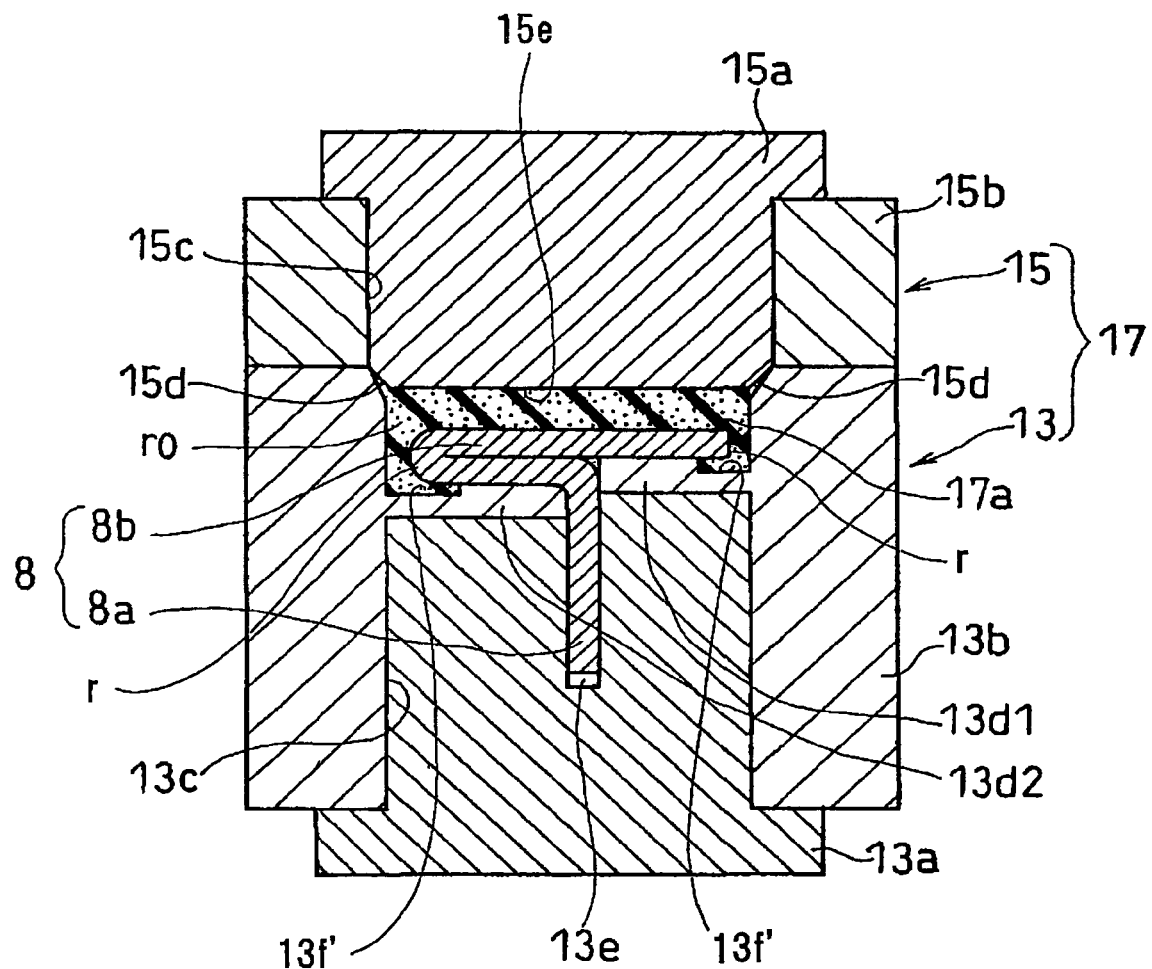
FIG. 6 is an enlarged view diagrammatically showing an essential part "Y" in FIG. 4.

FIG. 4 and FIG. 6 show another preferable embodiment of a magnetic molding apparatus applied to the present invention. In this embodiment, the elastic raw material is united with a core metal to be produced as an annular molded body with core metal in the magnetic molding procedure. According to the magnetic molding apparatus B in this embodiment, the slinger 8 as shown in FIG. 1 and the rubber material constituting the tone wheel 9 are attached to be integrally molded, a cylindrical groove 13e, which communicates with the cavity 17a and is concentric with the cavity 17a, is formed on the magnetic die member 13a of the lower metal mold 13. The substantially cylindrical groove 13e is formed capable of being inserted with a cylindrical portion 8a of the slinger 8 from the cavity 17a, when the cylindrical portion 8a is inserted into the cylindrical groove 13e, the slinger 8 is positioned at the bottom of the cavity 17a with the brim portion 8b. The lower metal mold 13 is provided with annular molding wraparound receiving surface parts (projected portion of non-magnetic die member) 13d1, 13d2 formed with annular molding wraparound surfaces 13f, 13f on the non-magnetic member 13b and the annular molding wraparound surfaces 13f, 13f receive and support a wraparound portion r of the elastic raw material r0 which is wrapped around so as to cover a part of the back face of the brim portion 8b of the core metal 8 in the cavity 17a. The upper surface of the magnetic die member 13a facing the cavity 17a is covered with projected portions (a part of non-magnetic die member) 13d1, 13d2 projected into the width direction of the cavity 17a from both faces of the non-magnetic die member 13b, whereby the brim portion 8b of the slinger 8 and the projected portions 13d1, 13d2 exist between the unvulcanized rubber material r0 charged in the cavity 17a and the magnetic die member 13a so as not to directly contact the unvulcanized rubber material r0 and the magnetic die member 13a.

The lower face of the magnetic die member 15a of the upper metal mold 15 faces the cavity 17a as mentioned above so as to directly contact with the unvulcanized rubber material r0 charged in the cavity 17a and the flash groove 15d is also formed. The cavity 17a in this embodiment is formed such that the unvulcanized rubber material r0 wraps around both inner and outer circumferences of the brim portion 8b of the slinger 8 to form the wraparound portion r. For this purpose, the wraparound receiving portions 13d1, 13d2 are also projected to receive the wraparound unvulcanized rubber material r0 as mentioned above. If the unvulcanized rubber material r0 is entered, there is no fear of forming incursion flash caused when the unvulcanized rubber material r0 enters into the matching surface 13c of the distal of the magnetic die member 13a and that of the non-magnetic die member 13b because of the projected portions 13d1, 13d2 between the magnetic die member 13a and the unvulcanized rubber material r0 charged in the cavity 17a. Other structures are the same as the embodiment shown in FIG. 3 and FIG. 5 and the procedure of magnetic molding is the same as the embodiment, so the same reference numbers are allotted to the same members and their explanations are omitted here.

Figure 7:
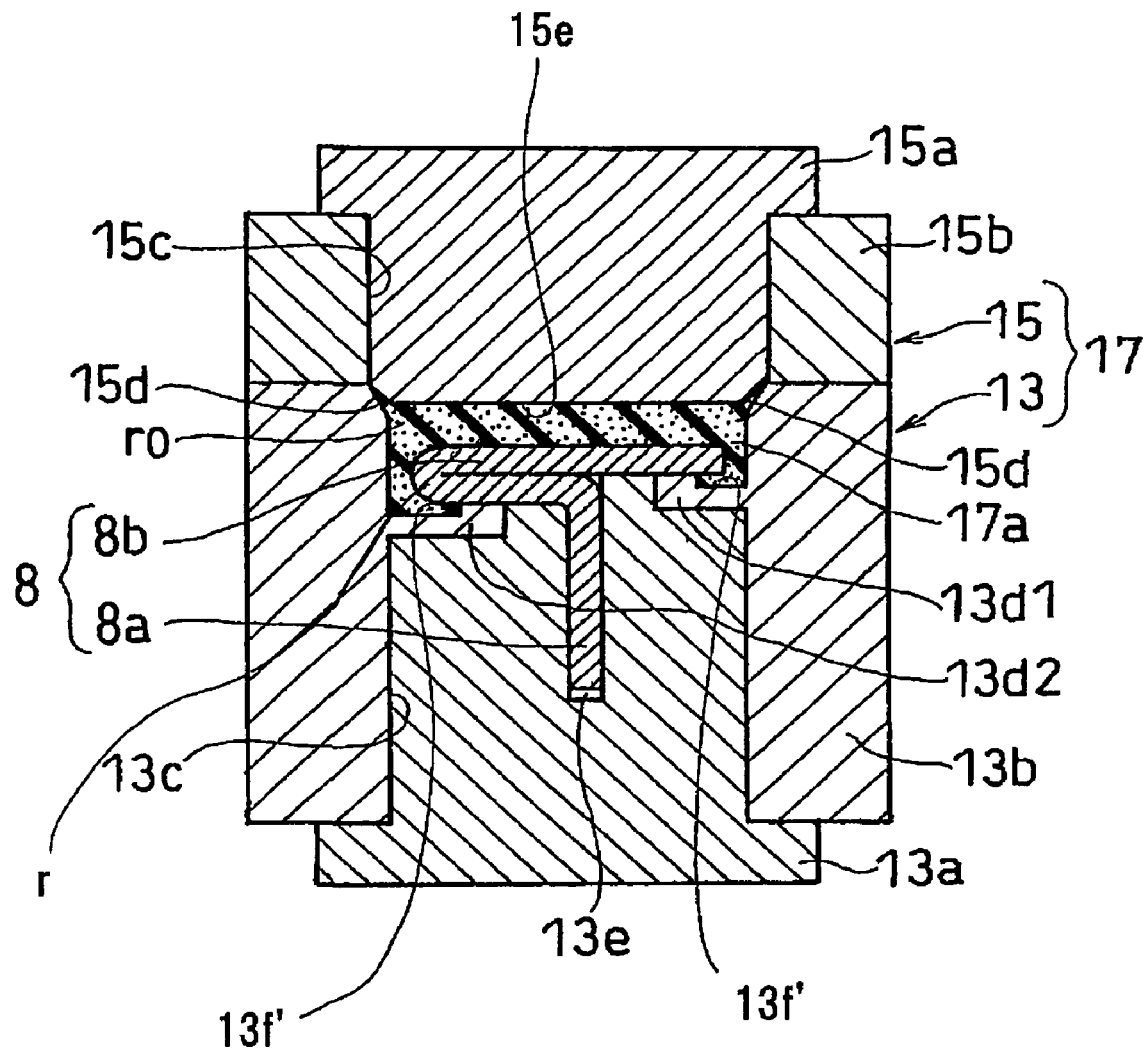
FIG. 7 shows a modified embodiment of FIG. 6.
Figure 8:
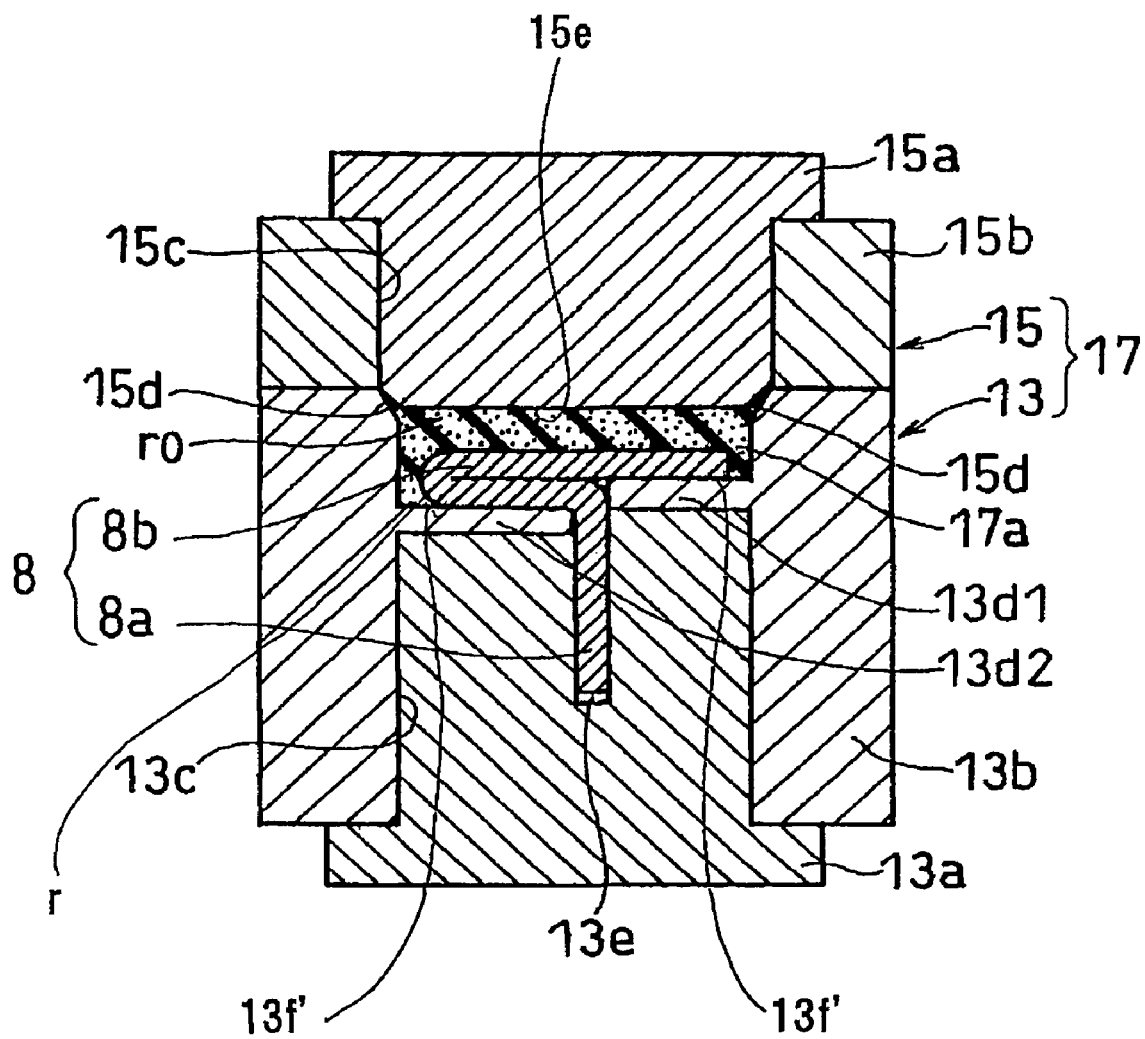
FIG. 8 shows a modified embodiment of FIG. 6.
Figure 9:
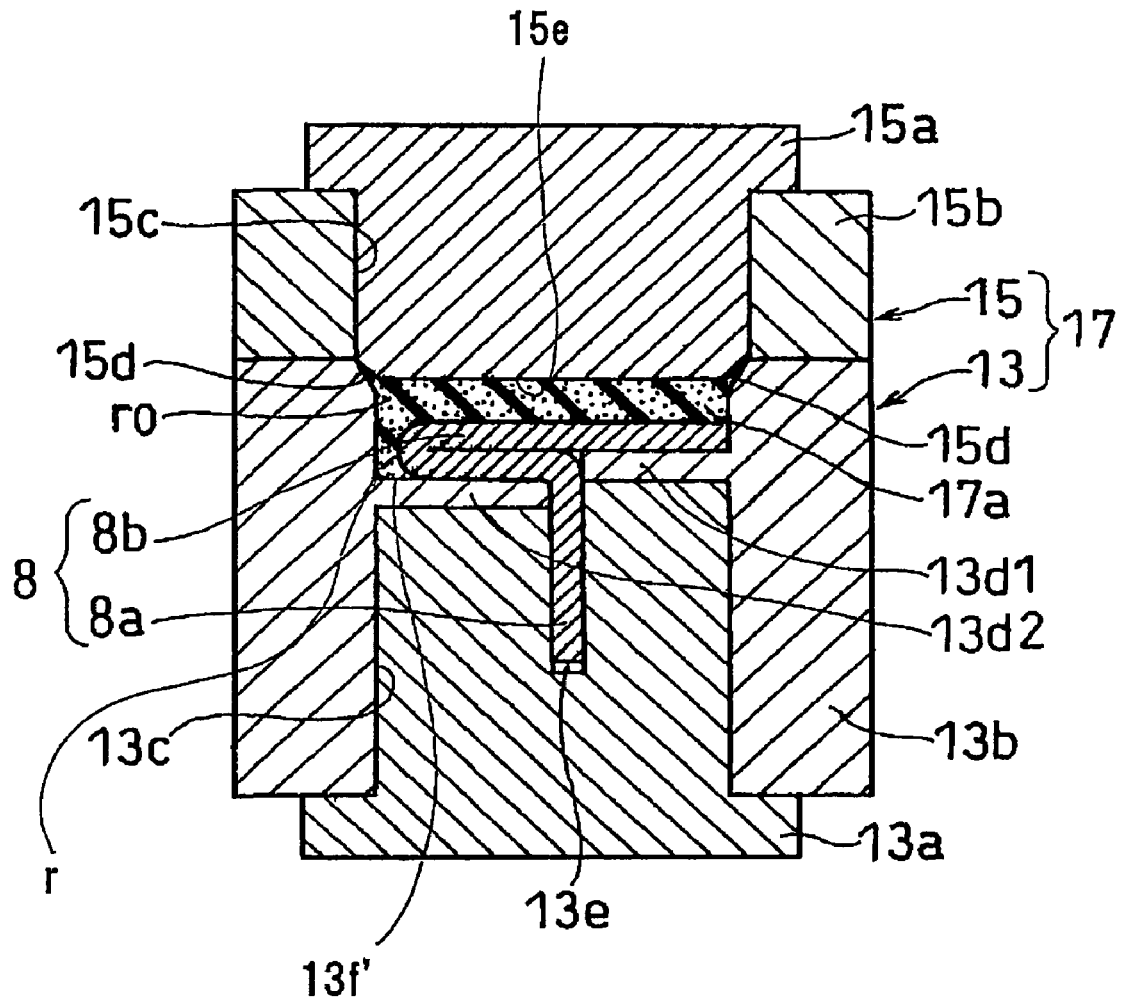
FIG. 9 shows a modified embodiment of FIG. 6.

FIG. 7-FIG. 9 show a modified embodiment when the slinger 8 and a rubber material are integrally formed respectively, as mentioned above. In the embodiment in FIG. 7 the shape of cavity 17a, namely the shape of molded body, is the same as that in FIG. 6, however, the projected portions 13d1, 13d2 have the different width. Other structures are the same as those in FIG. 6. In the embodiments in FIG. 8, FIG. 9, the shape of the wraparound portion r of the unvulcanized rubber material r0 into the inner and outer circumferences of the brim portion 8b in the cavity 17a is different and the projected portions 13d1, 13d2 are formed correspondingly. The basic structure is the same as the above-mentioned embodiment even though there is difference of shape, so that the same operation and effect can be obtained in case of magnetic molding. Therefore, these are optionally selected and applied as design matters. The other structure is the same as the above-mentioned embodiment so the same reference numbers are allotted to the same members and their explanations are omitted here.

EMBODIMENT 3

Figure 10:
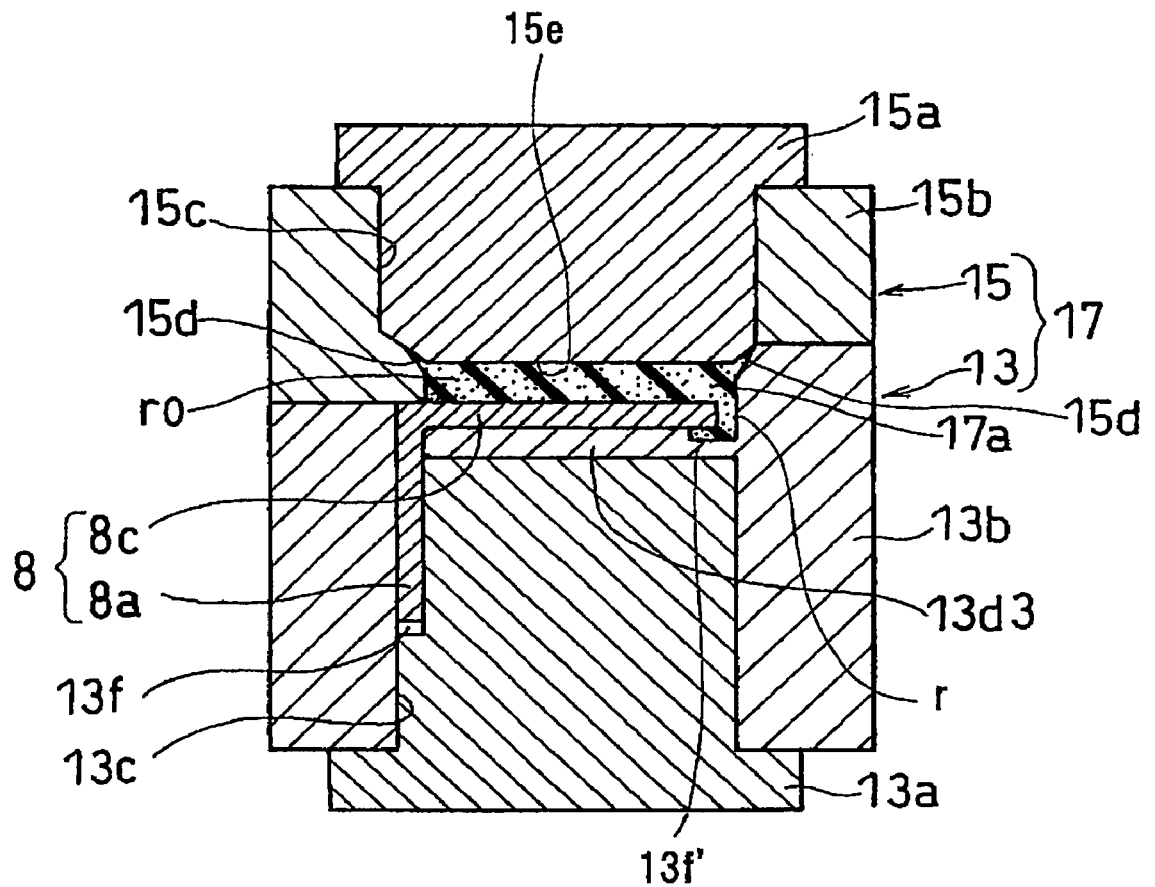
FIG. 10 shows another preferable embodiment of FIG. 6.

FIG. 10 shows another embodiment of FIG. 6 and FIG. 11-FIG. 17 show its modified embodiments. The slinger 8 is comprised of a cylindrical portion 8a and an inward brim portion 8c connected with the end of the cylindrical portion 8a. The slinger 8 in FIG. 6 has a substantially T-shaped section, however, it is L-shaped in this embodiment. A cylindrical groove 13f to be inserted with the cylindrical portion 8a is formed on the outer matching surface 13c of the magnetic die member 13a and the non-magnetic die member 13b and the projected portion (annular molding wraparound receiving surface part of a non-magnetic die member) 13d3, which covers the upper face of the magnetic die member 13a and extends to the inside of the cylindrical portion 8a, is projected out of the inner non-magnetic die member 13b. The function of projected portion 13d3 is the same as mentioned above, so that the operation and effect are also the same in case of magnetic molding.

Figure 11:
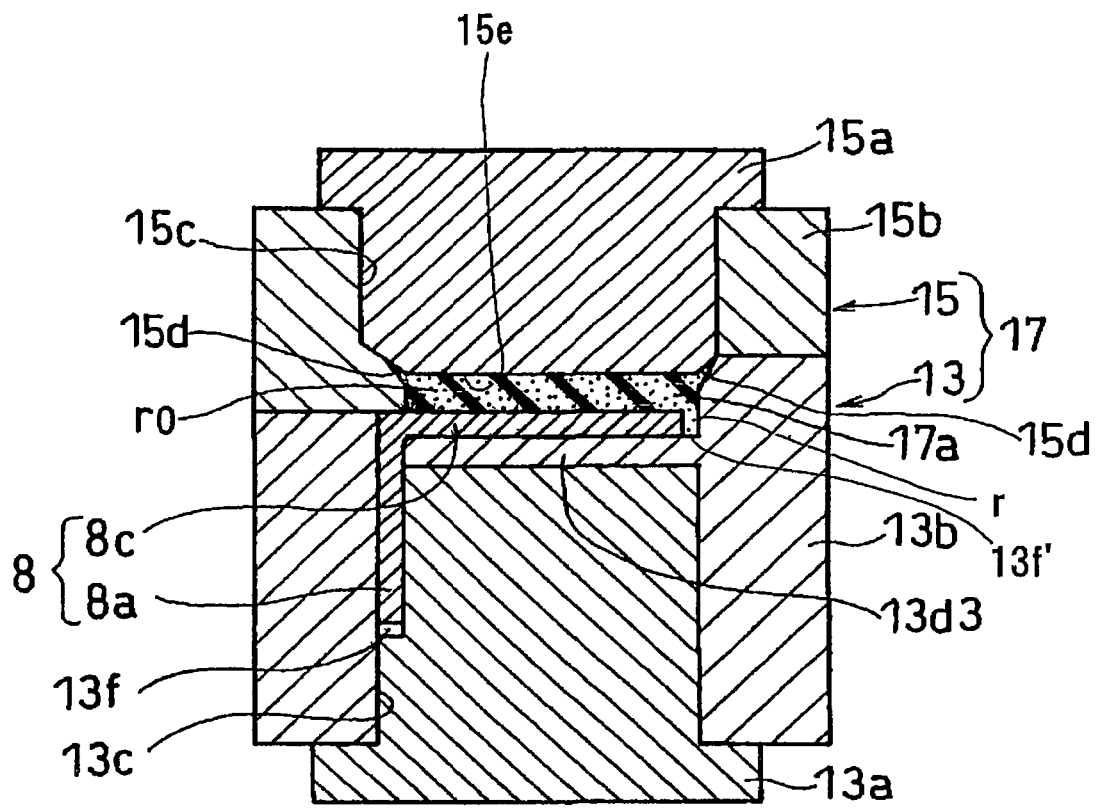
FIG. 11 shows a modified embodiment of FIG. 10.
Figure 12:
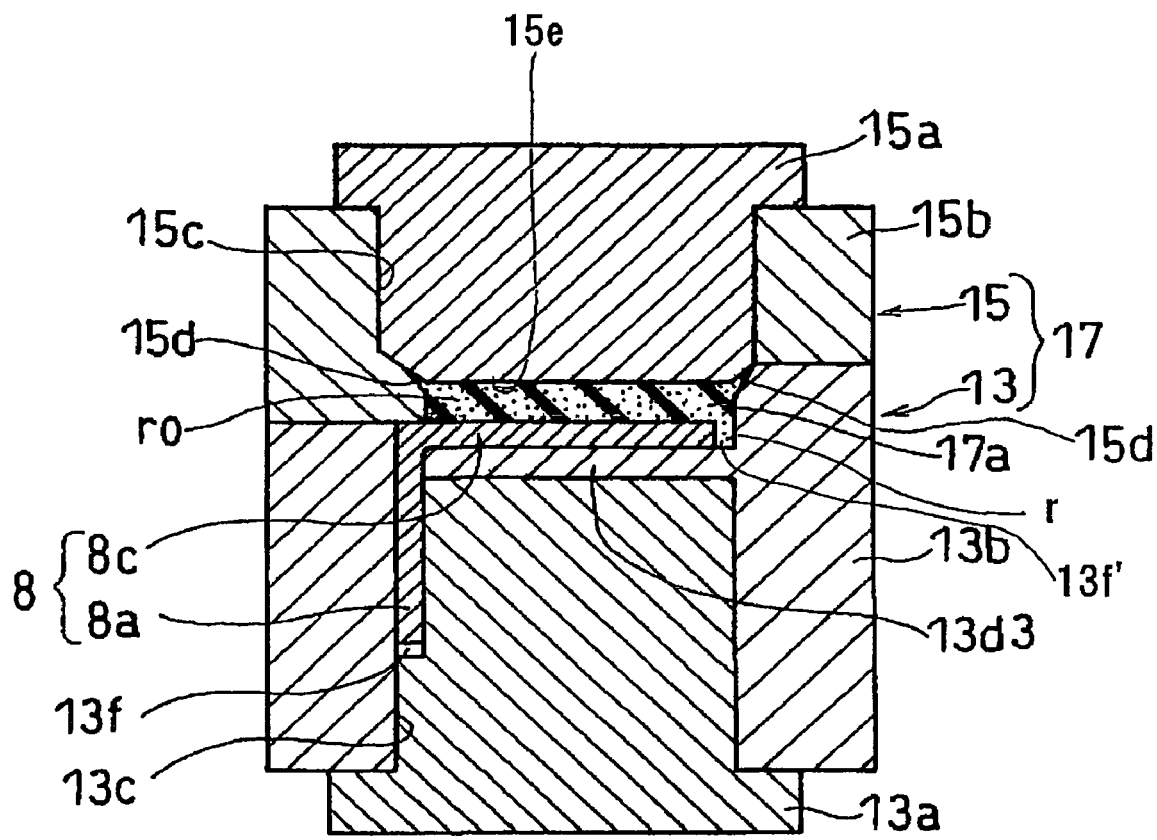
FIG. 12 shows a modified embodiment of FIG. 10.
Figure 13:
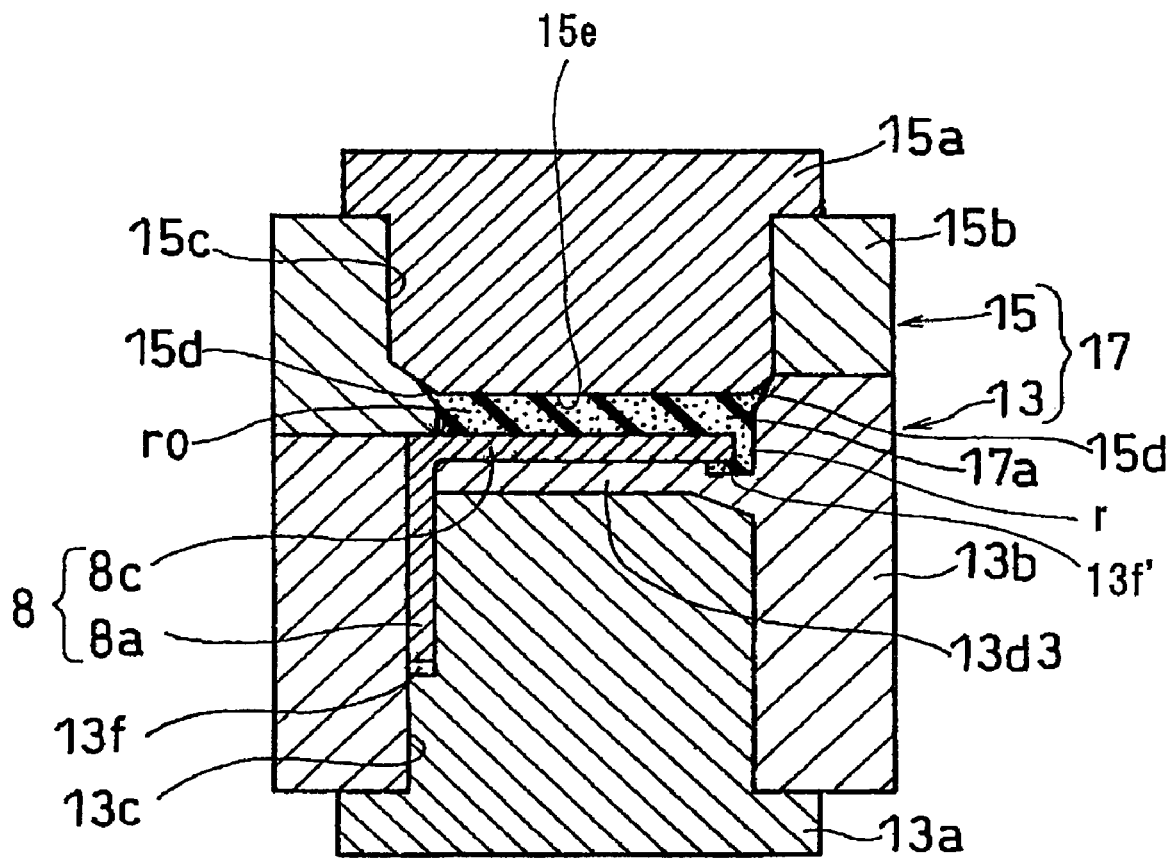
FIG. 13 shows a modified embodiment of FIG. 10.
Figure 14:
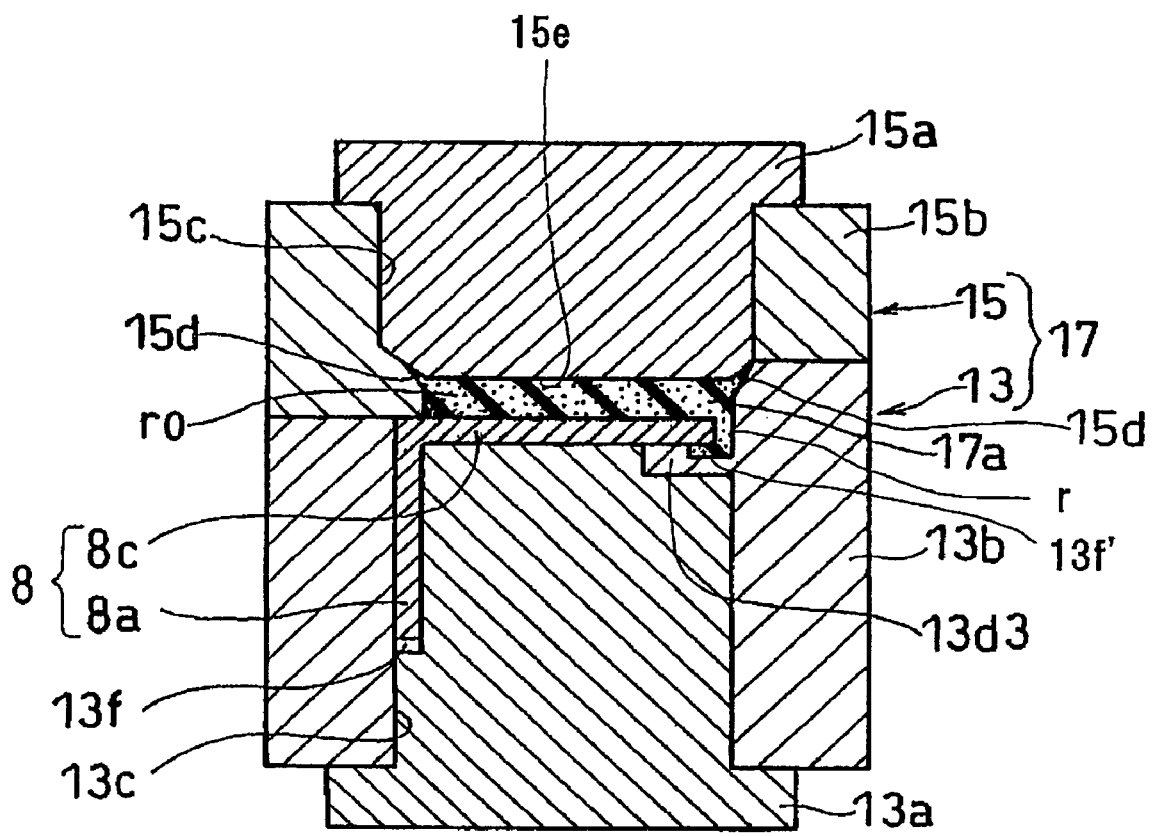
FIG. 14 shows a modified embodiment of FIG. 10.
Figure 15:
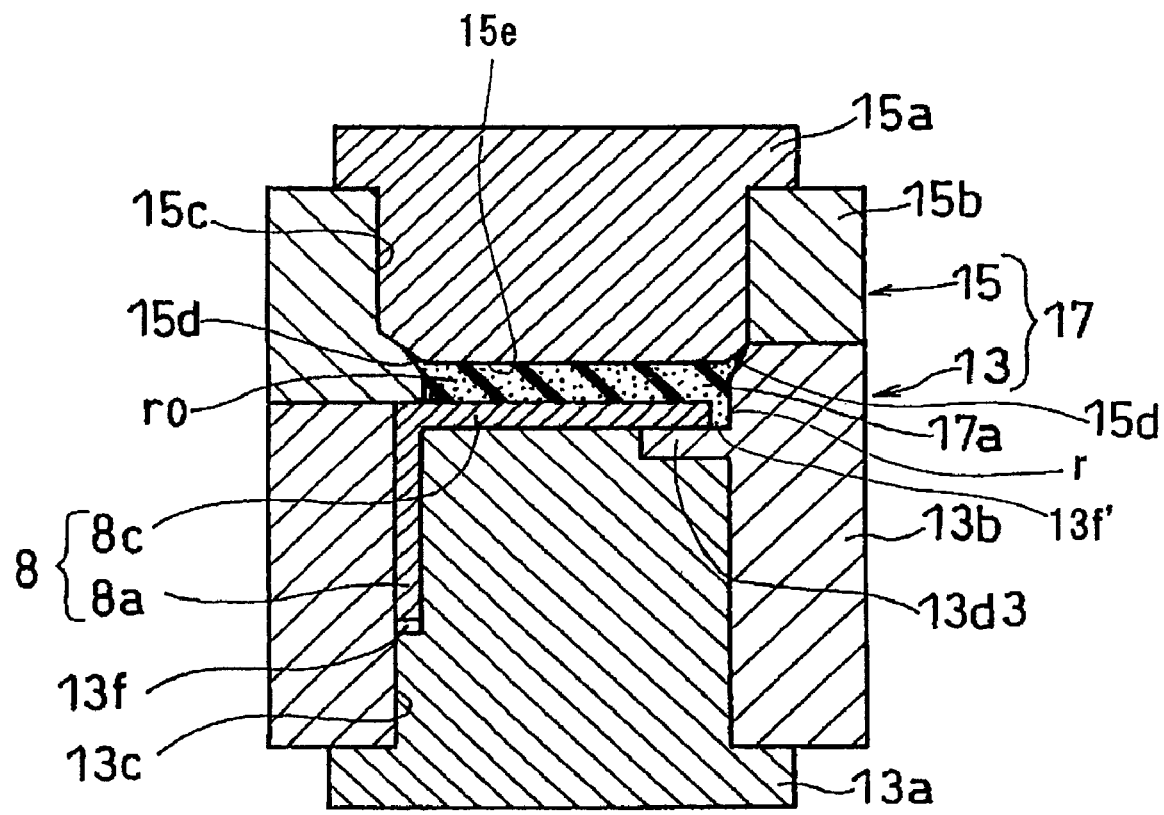
FIG. 15 shows a modified embodiment of FIG. 10.
Figure 16:
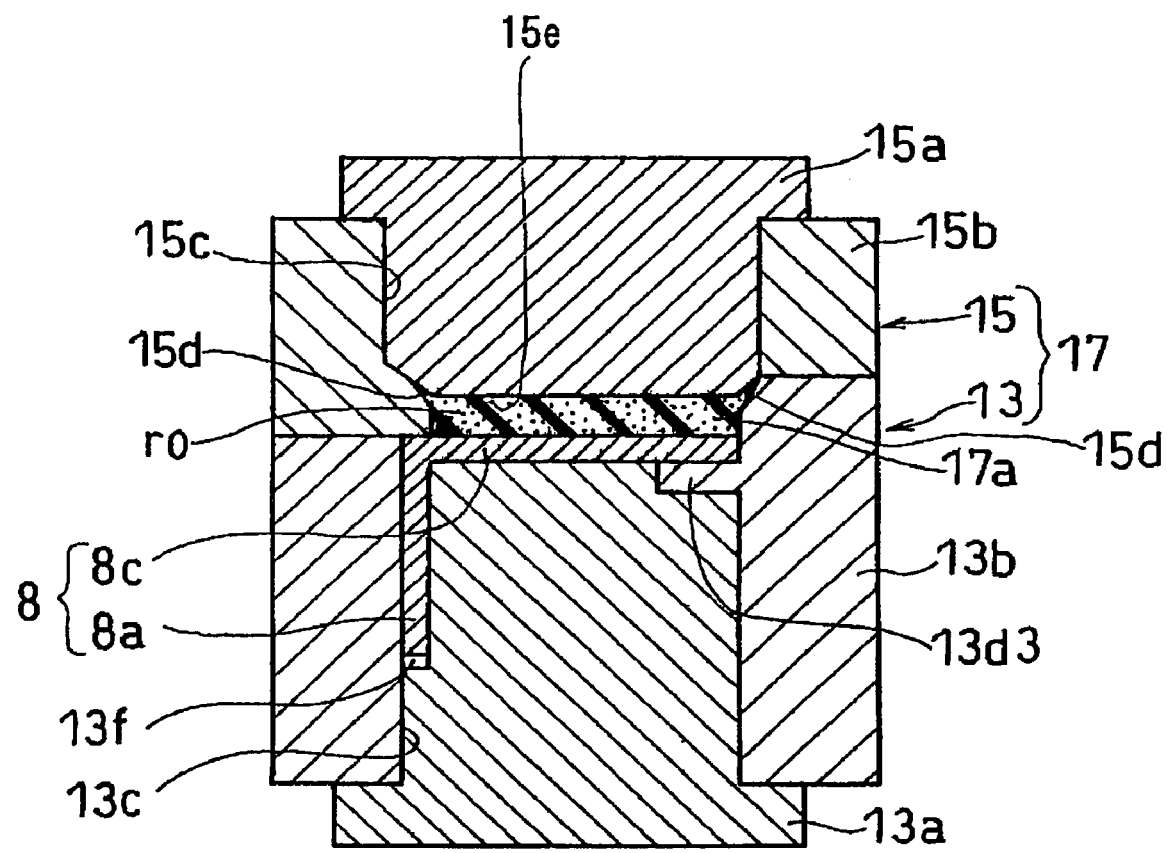
FIG. 16 shows a modified embodiment of FIG. 10.
Figure 17:
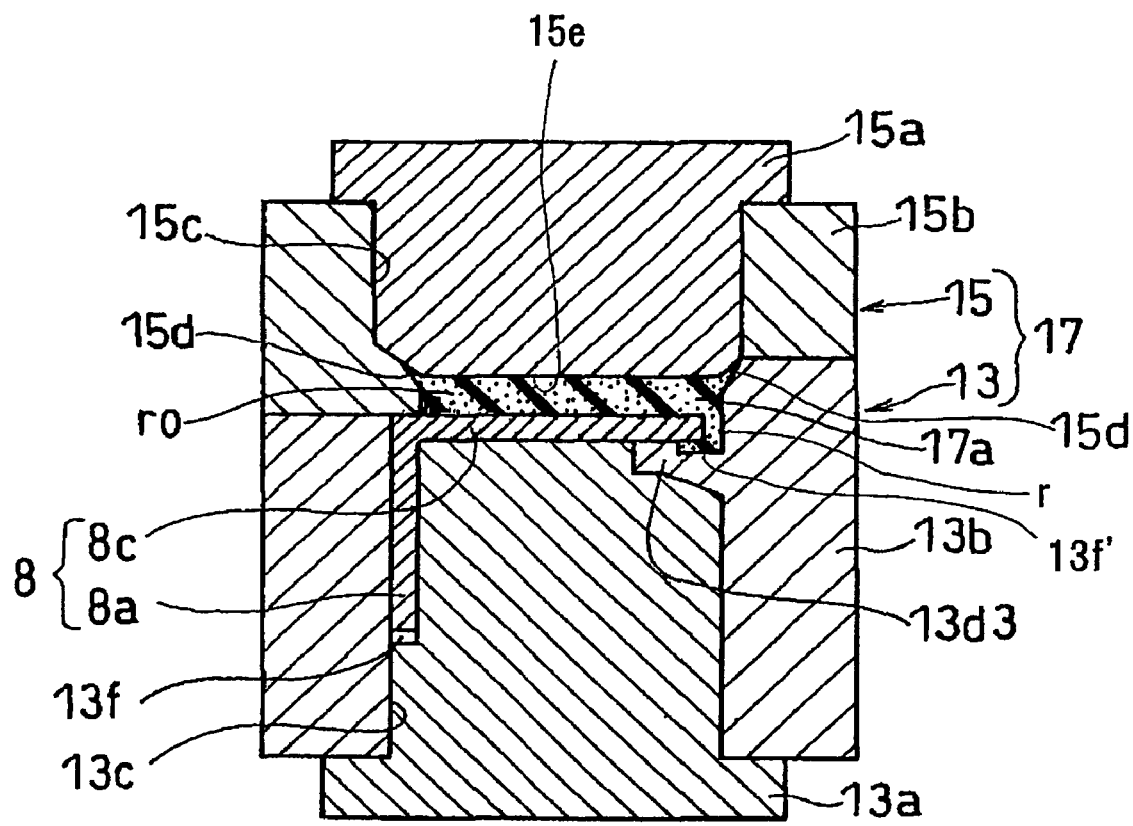
FIG. 17 shows a modified embodiment of FIG. 10.

The embodiments shown in FIG. 11 and FIG. 12 are different from the embodiment in FIG. 10 in that the wraparound portion r of the unvulcanized rubber material r0 into the inner circumference of the brim portion 8c in the cavity 17a is modified and the projected portion 13d3 is correspondingly molded. In the embodiment shown in FIG. 13, the base portion of the projected portion 13d3 is tapered to be thick according to the wraparound portion r of the unvulcanized rubber material r0 into the inner circumference of the brim portion 8c. Further FIG. 14-FIG. 17 show embodiments in which the width of projected portion 13d3 is made smaller and they show the shape of cavity 17a, namely several shapes of the projected portion 13d3 corresponding to the wraparound portion r of the unvulcanized rubber material r0 into the inner circumference of the brim portion 8c. In these embodiments, the function of projected portion 13d3 is the same as the above-mentioned embodiments, so that the operation and effect are the same in case of magnetic molding and they are optionally selected and applied as design matters. The other structure is the same as the above-mentioned embodiment so the same reference numbers are allotted to the same members and their explanations are omitted here.

In the embodiments shown in FIG. 10-FIG. 17, the brim portion 8c of the slinger 8 is formed inwardly, however it may be formed outwardly. The tone wheel 9 obtained by the method of the present invention is incorporated in the seal ring S of pack seal type, however the present invention is not limited to the embodiment. Further, in the embodiment in FIG. 1, the inner wheel is designed to be rotated, however, the tone wheel 9 of the present invention can be applied to the case where the outer wheel is rotated. In addition, an elastic material constituting the tone wheel 9 is made of rubber in the above-mentioned embodiments, however, it may be elastic resin material.

It is should be also noted that although the present invention proposes an assembled die which constitutes one die blocks and the other die blocks, such die blocks can be composed of several parts depending on their cavity shapes with flash grooves where elastic raw material is molded as annular molded bodies or annular molded bodies with slinger members. For example, such assembled die as shown in FIG. 10 can be divided into plural piece blocks in one die blocks and the other die blocks.

The preferred embodiments described wherein are therefore illustrative and not restrictive, the scope of the invention being indicated by the appended claims and all variations which come within the meaning of the claims are intended to be embraced therein.

The invention claimed is:

1. A production method for a tone wheel made of elastic material to be fixed to a rotating member in which a magnetic encoder is assembled in combination with said tone wheel and a magnetic sensor provided at a fixed member, said method comprising the steps of:

charging an elastic raw material mixed with magnetic powders into an annular cavity of an assembled molding die, said assembled molding die comprising a non-magnetic die member and a magnetic die member which constitutes magnetic pass;

generating a magnetic field in one predetermined direction and molding an annular molded body out of said elastic raw material mixed with magnetic powders, with said assembled molding die in said magnetic field, in which said magnetic field is applied to said elastic raw material in said annular cavity via said magnetic die member, thereby aligning said magnetic powder in said elastic raw material in one direction corresponding to said magnetic field; and magnetizing the surface of said annular molded body thus produced, with a magnetizing apparatus a pattern according to which the N poles and the S poles are alternately arranged along its circumference, wherein;

said assembled molding die has one die block and another die block which are detachably engaged with each other, and a flash groove at matching surfaces where the distal end of said one die block and that of said another die block are matched, and wherein said one die block has an annular molding surface formed on the magnetic die member side of said die, and said another die block has a non-magnetic annular molding receiving surface part which is formed with an annular molding surface to be interposed between said elastic raw material and said magnetic die member in such a manner that said elastic raw material and said magnetic die member do not contact each other.

2. A production method for a tone wheel made of elastic material to be fixedly attached to a brim portion of a slinger member fixed to a rotating member in which a magnetic encoder is assembled in combination with said tone wheel and a magnetic sensor provided at a fixed member, and said slinger member having a cylindrical body with said brim portion, said method comprising the steps of:

charging an elastic raw material mixed with magnetic powders together with said slinger member into an annular cavity of an assembled molding die, said assembled molding die comprising a non-magnetic die member and a magnetic die member which constitutes magnetic pass;

generating a magnetic field in one predetermined direction and molding an annular molded body with said slinger member out of said elastic raw material mixed with magnetic powders attached on said slinger member with said assembled molding die in said magnetic field, in which said magnetic field is applied to said elastic raw material in said annular cavity via said magnetic die member, thereby aligning said magnetic powder in said elastic raw material in one direction corresponding to said magnetic field; and magnetizing the surface of said annular molded body with said slinger member thus produced, with a magnetizing apparatus a pattern according to which the N poles and the S poles are alternately arranged along its circumference, wherein;

said assembled molding die has one die block and another die block which are detachably engaged with each other, and a flash groove at matching surfaces where the distal end of said one die block and that of said another die block are matched, and wherein said one die block has an annular molding surface formed on the magnetic die member side of said die, and said another die block has a non-magnetic annular molding wraparound receiving surface part formed with a partial annular molding receiving surface to be interposed between said elastic raw material and said magnetic member in such a manner that said elastic raw material and said magnetic die member do not contact with each other for receiving the wraparound part of said elastic raw material which partially covers the reverse side of said brim of said slinger member in said cavity on said non-magnetic die member side of said die.

3. The production method of a tone wheel as set forth in claim 1, wherein said elastic raw material is an unvulcanized rubber material which is heated and vulcanized in said molding step.

4. The production method of a tone wheel as set forth in claim 1, wherein said magnetic powder is anisotropic ferrite powder.

5. The production method of a tone wheel as set forth in claim 1, wherein said annular molding receiving surface part or said partial annular molding receiving surface part of said non-magnetic die member has a thickness of 0.3 mm to 10 mm in the direction of said magnetic field as applied to said cavity.

6. The production method of a tone wheel as set forth in claim 2, wherein said elastic raw material is an unvulcanized rubber material and heated and is vulcanized in said molding step.

7. The production method of a tone wheel as set forth in claim 2, wherein said annular molding receiving surface part or said partial annular molding receiving surface part of said non-magnetic die member has a 0.3 mm to 10 mm in the direction of said magnetic field as applied to said cavity.

* * * * *